(12) United States Patent
Anderson et al.

(10) Patent No.: US 9,137,371 B2
(45) Date of Patent: Sep. 15, 2015

(54) LEADS PROCESSING ENGINE

(75) Inventors: Van Anderson, Oceanside, CA (US);
David H. Anderson, Carlsbad, CA (US);
Brad L. Anderson, San Marcos, CA (US); Michael B. Anderson, San Marcos, CA (US); Jeffrey R. Anderson, San Marcos, CA (US)

(73) Assignee: RevAgency IP, LLC, Miami, FL (US)

( * ) Notice: Subject to any disclaimer, the term of this patent is extended or adjusted under 35 U.S.C. 154(b) by 2002 days.

(21) Appl. No.: 11/774,378

(22) Filed: Jul. 6, 2007

(65) Prior Publication Data
US 2009/0010410 A1 Jan. 8, 2009

(51) Int. Cl.
*H04M 3/00* (2006.01)
*H04M 5/00* (2006.01)
*H04M 3/523* (2006.01)
*G06Q 30/08* (2012.01)

(52) U.S. Cl.
CPC ............ *H04M 3/5233* (2013.01); *G06Q 30/08* (2013.01)

(58) Field of Classification Search
USPC ..................................... 379/265.01; 705/7, 9
See application file for complete search history.

(56) References Cited

U.S. PATENT DOCUMENTS

| | | | | |
|---|---|---|---|---|
| 5,970,132 A * | 10/1999 | Brady | ...................... | 379/212.01 |
| 6,704,396 B2 * | 3/2004 | Parolkar et al. | ............ | 379/88.17 |
| 7,899,177 B1 * | 3/2011 | Bruening et al. | ........ | 379/265.05 |
| 2001/0047289 A1 | 11/2001 | Mckee et al. | | |
| 2002/0077871 A1 | 6/2002 | Udelhoven et al. | | |
| 2002/0147732 A1 * | 10/2002 | Lee et al. | ...................... | 707/200 |
| 2003/0169870 A1 * | 9/2003 | Stanford | .................. | 379/265.12 |
| 2004/0202308 A1 * | 10/2004 | Baggenstoss et al. | ... | 379/265.06 |
| 2005/0111653 A1 * | 5/2005 | Joyce et al. | ............. | 379/265.09 |
| 2005/0135335 A1 * | 6/2005 | Hession et al. | ............... | 370/352 |
| 2005/0261929 A1 * | 11/2005 | Hansen et al. | .................... | 705/1 |
| 2006/0093123 A1 * | 5/2006 | Becerra et al. | ........... | 379/265.01 |
| 2006/0265259 A1 | 11/2006 | Diana | | |
| 2006/0277115 A1 | 12/2006 | McKee et al. | | |
| 2007/0127687 A1 * | 6/2007 | Yoshizawa et al. | ...... | 379/265.01 |
| 2008/0140496 A1 * | 6/2008 | Mink | ............................... | 705/9 |

* cited by examiner

*Primary Examiner* — Oleg Asanbayev
(74) *Attorney, Agent, or Firm* — Sheppard Mullin Richter & Hampton LLP (57) ABSTRACT

The present invention is directed to a system and method for generating, processing and distributing leads, the system comprising a leads processing engine for receiving customer requests, creating leads based upon the customer requests, determining a best available agent or agents for each lead from a pool of available agents based upon one or more selected factors, and offering and/or sending each lead to the best available agent or agents.

48 Claims, 3 Drawing Sheets

LEADS PROCESSING ENGINE

FIELD OF THE INVENTION

This invention broadly relates to the generation and distribution of leads, and more particularly, to systems and methods for generating, processing and distributing leads using a leads processing engine.

BACKGROUND OF THE INVENTION

With the advent of the Internet and its ease of use to research and book travel, travel agencies had to change their model to successfully compete. In a traditional setting, customers would visit retail storefront or "brick and mortar" travel agency locations and make travel plans while looking at brochures and sitting face-to-face with a travel agent. As the Internet became more and more prevalent in the travel industry, storefront locations began closing and many travel agents were faced with a choice—find a new career or open their own home based travel agency. Many home based travel agents own and operate their own business and use a host agency that may provide benefits such as higher commission levels from suppliers, support and technology.

Some host agencies and others in the travel industry have attempted to send leads out to one or more travel agents as part of a large email blast along with details of the customer lead and contact information. Once an email is received, one or more travel agents contact the customer directly and then the customer selects the "best offer". Agents are often charged per lead or share in the commission. Another prior method comprises sending out a mass Instant Message to a large pool of agents, wherein the first to respond gets the lead or simply transferring customer leads by phone common ACD phone systems and typical distribution methods such as longest available or round-robin. A disadvantage of all of these methods used to distribute leads is that none determine and distribute based on which particular agent or agents are most likely to close not just the current lead with high levels of customer service but will also create additional and ongoing sales from these leads thru returning customers and referrals thereby optimizing the ROI for both the selling agent and the company providing the leads.

SUMMARY OF THE INVENTION

The present invention is directed to systems and methods for supplying phone leads, electronic leads, and web leads to agents working at local and remote locations. As used herein the term, "agents," may include independent affiliates, independent contractors, agencies, individual agents, other companies and other workers. In an exemplary implementation of the invention, the leads are supplied to agents, e.g., working in the travel industry. However, as would be apparent to those of skill in the art, the principles of the invention may be applied to any other industry wherein leads are supplied to a pool of agents, without departing from the scope of the present invention. With respect to web leads, a customer may submit a web request to a leads processing engine, which processes the request and automatically sends out the lead (e.g., over a network, the Internet or via a text message) to a best available agent or agents based upon an algorithm that considers a number of relevant factors, rankings, and/or categories. According to one implementation of the invention, the processing engine comprises a leads processing engine. In the case of a phone call, the customer may dial into a call center location wherein a customer care representative answers the call, and then enters in basic information such as customer name, phone number and email address. The call is then entered into the leads processing engine, which processes the request and automatically sends out the lead to the best available agent or agents based upon the algorithm.

The leads processing engine of the invention allows a company such as a host agency to use its clout and relationships with global suppliers to supply leads to home based or remote agents. The processing engine makes lead distribution decisions based upon an algorithm comprising machine-readable or interpretable instructions for determining which agent or agents receive a particular lead. In its simplest form, the algorithm ensures that successful, high producing agents are given a higher number of leads, whereas non-producing, poor sales agents are given a limited number of leads, or no leads.

As set forth above, the leads processing engine processes leads, including (i) web/electronic based form submissions that come from a consumer facing website, and (ii) live phone calls that are answered by a call center representative or (iii) other formats such as Instant Message and Video messages/calls. Both types of leads are calculated and ranked by the leads processing engine before being offered and/or sent out for claiming by agents, affiliates, contractors, etc. The leads processing engine utilizes a combination of presence indicators such as IM presences and ranking features to send out the lead to the best available agent or agents for a selected lead.

A preferred system for distributing leads in accordance with the principles of the invention comprises one or more call center representatives for receiving and entering incoming customer requests from customer contacts, and a leads processing engine for receiving the customer requests, creating leads based upon the customer requests, determining a best available agent or agents for each lead from a pool of available agents based upon one or more selected factors, and sending each lead to the best available agent or agents. Other embodiments of the invention feature the use of VOIP (and/or other technology) that obviates the need for call center representatives by allowing leads to be processed automatically. Further embodiments of the invention feature web leads that obviate the need for call center representatives by allowing leads to be processed automatically with information provided directly by the customer. The selection of the best available agent is based upon an algorithm comprising machine readable or interpretable instructions for determining the best available agent or agents. Upon receiving an incoming customer request, the call center representative or lead processing engine enters the customer request and the lead processing engine optionally searches a database to determine whether a prior relationship exists with the customer contact.

In at least one implementation of the invention, if the customer contact exists in the database, the processing engine determines the agent who last worked with the customer, and may direct the lead to this agent using the prior relationship with the customer. The determination of a prior relationship with the customer contact may be based upon the agent who last booked the customer contact and/or the agent who had last contact with the customer contact. If the incoming call is from a new customer contact that does not exist in the database, the call center representative enters basic information of the new customer contact including a customer name, an email address and a contact number. The call center representative queries the customer contact regarding the customer's destination and/or preferred supplier, as well as the customer's preferred language. According to some embodiments, either the destination or the preferred supplier is a required field for the lead to be entered by the call center representative into the leads processing engine. The call center representative enters the customer's destination and/or preferred supplier into leads processing engine, and also enters the customer's preferred language.

In the preferred system, the leads processing engine finds all available agents having a specialty, combination of specialties or relevant experience with respect to a particular type of lead. In some embodiments, an agent must log onto the leads processing engine and provide an indication of availability in order to be offered a lead. The best available agent may comprise a specialist or specialists chosen from a group of agents that specialize in and/or have experience closing a particular lead type. For each lead, the leads processing engine pools all available agents for a particular specialty based upon the type of lead, and provides a ranking of agents derived from one or more selected factors. These factors may include without limitation, (i) closing ratio based upon a specific vendor and/or destination, (ii) total sales over a selected time frame with respect to a selected vendor and/or destination, (iii) total SQi (Service Quality Index), (iv) recency and/or total time agent has been logged into the leads processing engine over a selected time frame, (v) repeat and/or referral customer percentages overall and/or per lead; (vi) average revenue per sale based on vendor and/or destination, (vii) average revenue per lead by vendor and/or destination, (viii) average bookings per lead claimed; (ix) agent education and/or industry based certifications from vendors, destinations, and educational outlets, (x) maximum amount per lead (% and/or $) agent is willing to pay; (xi) minimum share of commission per lead (% and/or $) agent is willing to accept; and (xii) manual override (x-factor) that may be set by a system administrator to skew the curve if necessary; (xiii) average and anticipated "hold" times; (xiv) number of leads available; and (xv) the trends of these factors and/or others. According to an additional embodiment of the invention, the lead processing engine may be used in selling leads to outside sources.

The best available agent selects or clicks on the lead from a leads processing engine screen to claim the lead, which may be offered and/or sent to the best available agent by conventional phone transfer, using VoIP to transmit the lead by voice signals over the Internet or other data network, or using the leads processing engine to electronically transmit the lead over the Internet or other data network, for example in the form of an email or Instant Message. The one or more selected factors may be selectively weighted such that different factors include different weights in determining the best available agent.

According to further embodiments of the invention, the leads processing engine pools all available agents for a particular specialty based upon the type of lead, and provides a tiering of agents derived from one or more selected factors, such that each available agent is slotted within a tier level. These factors may be selectively weighted such that different factors include different weights in determining the tier for each agent. Each agent is slotted in a tier level that is based on the agent's ranking in comparison to the other agents, and tier levels may be calculated on a daily basis. When a new lead is submitted, the leads processing engine accesses agent tier information stored in a database (or dynamically calculated), and determines the total available agents based on a vendor or supplier specialty submitted by the customer care representative, or automatically submitted using VOIP or web leads.

The leads processing engine then sorts the tiers from highest ranking to lowest ranking. Pooling for a particular specialty based upon the type of lead is performed in anticipation of a rollout of the leads, wherein the leads are distributed to the tiers of agents over time in accordance with the rankings. The rollout is accomplished by releasing the lead over time, first to the highest ranking tier, then to the next highest ranking tier, and continuing until the lead is released to the lowest ranking tier, or until an available agent claims the lead. The highest ranking tier is given exclusive rights to claim the lead for a predetermined time period before the next highest ranking tier is given access to the lead, whereby the rollout is skewed to provide the top tiers with a greater opportunity than the lower tiers to claim the lead.

A preferred method for distributing leads in accordance with the principles of the invention comprises the steps of: (a) receiving an incoming request from a customer contact and entering the request into a leads processing engine; (b) requesting information from the customer contact regarding the customer's destination and/or the customer's preference regarding supplier, as well as the customer's preferred language; (c) entering the lead into the leads processing engine; (d) determining a best available agent from a pool of available agents based upon one or more selected factors; and (e) sending the lead to the best available agent. Steps (a), (b) and (c) may be performed by a call center representative, and step (d) is performed by the leads processing engine. In some embodiments, steps (a), (b), (c), (d) and (e) are performed automatically using VOIP or web leads.

In the preferred method, step (c) comprises entering the customer's destination and/or the customer's preference regarding supplier, as well as the customer's preferred language, into the leads processing engine. In some embodiments, step (c) may involve entering the customer's preferred location of agent into the leads processing engine. For example, there are countries that may require leads to be serviced by an agent within their own country. In addition, step (e) may be accomplished via conventional phone transfer, using VoIP, or using email or instant messaging. Step (a) may optionally further comprise searching a database of the leads processing engine to determine whether a prior relationship with the customer contact exists. In one implementation of the invention, if the customer contact exists in the database, the leads processing engine determines the agent who last worked with the customer, and notifies the customer care representative to direct the call to this agent. Step (a) may apply to last sale but not necessarily last contact in all cases. For instance, if the agent with last contact is a low closer, the leads processing engine may forward the lead to another agent.

According to the invention, a further method for distributing leads comprises the steps of: (a) receiving an incoming request from a customer contact and entering the request into a leads processing engine; (b) requesting information from the customer contact regarding the customer's destination and/or the customer's preference regarding supplier, as well as the customer's preferred language; (c) entering the lead into the leads processing engine; (d) pooling all available agents for a particular specialty based upon the type of lead, and providing a tiering of agents derived from one or more selected factors, such that each available agent is slotted within a tier level; and (e) rolling out the lead to the agents over time by tier; wherein steps (a), (b) and (c) are performed by a call center representative, and steps (d) and (e) are performed by the leads processing engine. Each agent is slotted in a tier level that is based on the agent's ranking in comparison to the other agents. Step (e) is accomplished by releasing the lead over time, first to the highest ranking tier, then to the next highest ranking tier, and continuing until the lead is released to the lowest ranking tier, or until an available agent claims the lead. The highest ranking tier is given exclusive rights to claim the lead for a predetermined time period before the next highest ranking tier is given access to the lead, whereby the rollout is skewed to provide the top tiers with a greater opportunity than the lower tiers to claim the lead.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Before starting a description of the Figures, some terms will now be defined.

Host Agency: A host agency is a company having a group of independent contractors or franchisees that use the host agency's buying power for increased commission levels, support and/or technology.

Best Available Agent: A best available agent is the agent or agents that is most likely to generate the highest ROI for the company (e.g., host agency), agent and customer in terms of both quantity, quality, value and experience from the leads distributed.

Leads: Leads include any type of customer submission to the host agency, such as a new call, web submission, or live chat. The leads of the invention may include, but are in no way limited to, sales leads, help leads, and support request leads.

Booking: A booking includes any sale that has been deposited by a customer for a reservation.

Last Contact: The agent of last contact is the agent who last emailed, called, or contacted the customer.

Agent Tiers: Agent tiers are levels that are calculated on a periodic (e.g., daily) basis using one or more of the factors described herein.

The present invention is directed to a leads processing engine for supplying leads to agents working at remote locations, or working in a call center or other internal office. In particular, customers may submit web requests to the leads processing engine, which processes the requests and automatically sends out leads over a data network such as the Internet (or via a text message, etc.) to the best available agent based upon an algorithm that considers a number of relevant factors, rankings, and/or categories. Customer may also dial into a call center location wherein a customer care representative (CCR) answers the call, and enters the customer's basic information into the leads processing engine. Alternatively, VOIP, web leads, and/or other technologies may be employed to obviate the need for call center representatives by allowing leads to be processed automatically. According to a further embodiment of the invention, the lead processing engine may be used in selling or distributing leads to outside sources.

Figure 1:
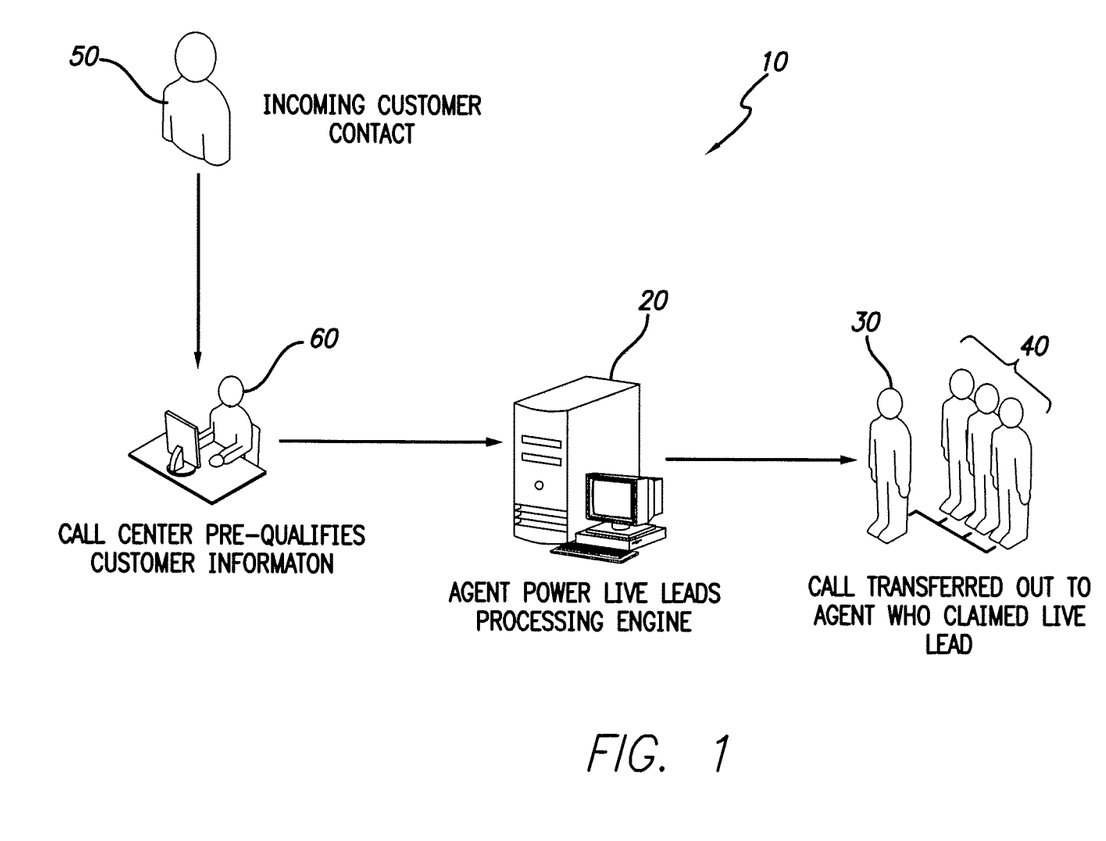
FIG. 1 is a schematic diagram illustrating a preferred system for distributing leads in accordance with the principles of the invention.

FIG. 1 is a schematic diagram illustrating a preferred system 10 for distributing leads in accordance with the principles of the invention. In particular, the system features a leads processing engine 20 that processes incoming customer requests and automatically sends out the resulting lead to a predetermined agent 30 from a pool of agents 40. The selection of the agent 30 is based upon an algorithm comprising machine readable or interpretable instructions for determining the particular agent 30. This determination may be based upon one or more relevant factors, rankings, and/or categories, as set forth herein. According to further embodiments of the invention, the algorithm may be configured to determine a group or tier of individual agents that are most likely to close a particular lead based upon the selected factors, rankings, and/or categories.

In operation, the leads process begins with a new call from a customer contact 50 that is answered by a call center representative 60 for pre-qualifying the customer information. Alternatively, VOIP, web leads, and/or other technologies may be employed to preclude the need for call center representatives by allowing leads to be processed automatically. In some embodiments of the invention, the call center representative (CCR 60) initially searches a database of the leads processing engine 20 to determine the existence of a prior relationship with the customer contact 50. If the customer contact 50 exists in the database, the processing engine 20 determines the agent who last worked with the customer, and notifies the CCR 60 to direct the call to the previous agent. The determination of a past relationship with a customer may, for example, be based upon (i) the agent who last booked the customer and/or (ii) the agent who had last contact with the customer. If an incoming call is from a new customer contact 50 that does not exist in the database, the CCR 60 enters basic information such as customer name, email address and contact number. The CCR 60 also queries the customer contact 50 regarding the destination of choice and/or the customer's preference regarding supplier, as well as the customer's preferred language (e.g., English, Spanish, etc.). According to some embodiments, either the supplier or the destination is a required field for the lead to be entered by the CCR 60 and properly submitted for an agent to claim.

Once the lead has been submitted into the leads processing engine 20, the CCR 60 may place the customer contact 50 on hold while the processing engine 20 sends out the lead to the best available agent 30 from the pool of available agents 40. In particular, the leads processing engine 20 finds all available agents having a specialty or relevant experience with respect to the particular type of lead. In an exemplary implementation of the invention, the leads processing engine 20 operates using an open source version of Jabber Presence, an Instant Messaging system that utilizes the XMPP method of communication over HTTP. In the preferred embodiment, available agents must be logged onto the leads processing engine 20, and be set as "available" on their IM client in order to be offered a lead.

With further reference to FIG. 1, after the customer care representative 60 takes the initial call from a customer contact 50 and gathers the requisite information, the CCR 60 then enters into the leads processing engine 20 a vendor or a destination, as well as the customer's preferred language. Once the request has been entered into the leads processing engine 20, the processing engine 20 finds the best available agent 30 from the pool of available agents 40. According to some embodiments, the best available agent 30 may be a specialist chosen from a group of specialist agents that specialize in and/or have experience closing particular lead types. Of course, not all agents are specialists or have significant experience with respect to every type of lead. For example, certain agents may only sell a specific vendor, or a specific destination. An expert for a particular vendor (e.g., Carnival Cruise Lines) may not be placed into a specialty group (e.g., cruises) regardless of the agent's availability, such that the agent would not receive leads from other cruise vendors such as Norwegian Cruise Lines. According to the invention, specialists for vendors and destinations may be selected based upon the agent's proven knowledge and sales trends, which are tracked through the leads processing engine 20 and maintained by a system administrator.

For each lead, the leads processing engine 20 pools all available agents for a particular specialty based upon the type of lead, and provides a ranking of agents derived from one or more selected factors. The first available agent (from the top tier of agents for the particular specialty) that selects or clicks on the lead from their leads processing engine 20 screen is then provided with the lead. According to the invention, the lead may be offered and/or sent to the agent in any number of means, including, but not limited to: (1) by conventional phone transfer; (2) using Voice over Internet Protocol (VoIP) or similar technology residing on the leads processing engine 20 to transmit the lead by voice signals over the Internet or other data network; or (3) using the leads processing engine 20 to electronically transmit the lead over a data network in the form of an email, Instant Message, or other form of electronic communication. For example, the Simple Mail Transfer Protocol (SMTP) may be employed to transfer electronic messages over the network. Alternatively, other messaging protocols may be employed including without limitation, simple network paging protocol (SNPP), wireless communication transfer protocol (WCTP), multimedia message service (MMS), Wireless Village, and any other messaging protocol designed for the transfer of messages. As would be appreciated by those of skill in the art, any number of additional methods of information transfer may be employed to transmit leads to agents without departing from the scope of the invention.

In accordance with the principles of the invention, tier levels for a predetermined specialty or combination of specialties are calculated based upon one or more of the following factors: (1) closing ratio based upon a specific vendor (e.g., Carnival Cruise Lines, Norwegian Cruise Lines, etc) and/or destination (e.g., Hawaii, Europe, Mexico, etc.); (2) total sales over a selected time frame (e.g., the past 30 days, 60 days, 90 days, etc.) with respect to a selected vendor and/or destination; (3) total SQi (Service Quality Index) scores, a calculation to measure customer service and customer experience including data from general customer feedback and from customer surveys sent at various times whether a lead is converted to a booking or not; (4) recency and/or total "available" time agent has been logged in the leads processing engine; (5) repeat and/or referral customer percentages overall and/or per lead; (6) average revenue per sale by vendor and/or destination; (7) average revenue per lead by vendor and/or destination; (8) average bookings per lead claimed; (9) agent education and/or industry based certifications from vendors, destinations, and educational outlets; (10) maximum amount per lead (% and/or $) agent is willing to pay; (11) minimum share of commission per lead (% and/or $) agent is willing to accept; (12) manual override (x-factor) that may be set by a system administrator to skew the curve if necessary; (13) average and anticipated "hold" times; (14) number of leads available; and (15) the trends of these factors and/or others.

In a preferred implementation of the invention, any or all of the above-identified factors may be selectively weighted. By way of example, three different factors such as (i) closing ratio based upon a specific vendor and/or destination, (ii) total sales over a selected time frame with respect to a selected vendor and/or destination, and (iii) total SQi (Service Quality Index) scores may be selected by the system administrator and weighted equally (i.e., ⅓, ⅓, ⅓) to determine agent rankings and tiers. Alternatively, these and/or other selected factors may be provided with different weights to skew the rankings in favor of one or more factors.

After agent rankings have been determined, each agent is slotted in a "tier" level that is based on the agent's ranking in comparison to the other agents. Any number of tiers may be employed, and this number may increase or decrease over time as agents are added or subtracted from the available pool. Tiers are calculated periodically by the leads processing engine 20 and are stored in the database. For example, tiers may be calculated on a daily basis (e.g., every night), hourly, weekly, etc. When a new lead is submitted, the leads processing engine 20 accesses the agent tier information stored in the database (or dynamically created) and determines the total available agents based on the vendor/supplier specialty submitted by the customer care representative 60. The leads processing engine 20 then pools all of the agents together and sorts them, for example, from highest ranking to lowest ranking.

Compression of the tiers is performed such that the rollout is accurate and efficient for each group. According to the invention, rollout is accomplished by releasing the lead over time, first to Tier 1, then to Tier 2, then to Tier 3, etc., until an available agent claims the lead. In an exemplary embodiment, Tier 1 is given exclusive "rights" to claim the lead for a predetermined time period (e.g., 60 seconds). At the 61st second, Tier 2 is then afforded an opportunity to claim that lead such that both Tier 1 and Tier 2 have exclusive rights to claim the lead over the next time period (e.g., 55 seconds). After this time period has elapsed, the lead is made available to Tier 3 such that Tier 1, Tier 2 and Tier 3 share exclusive rights over the next time period (e.g., 50 seconds). This process is repeated until the lead is claimed by an available agent or the lead is made available to the lowest ranking tier of agents. In this manner, the rollout is skewed to provide the top tiers with a greater opportunity than the lower tiers to claim the lead.

Figure 2:
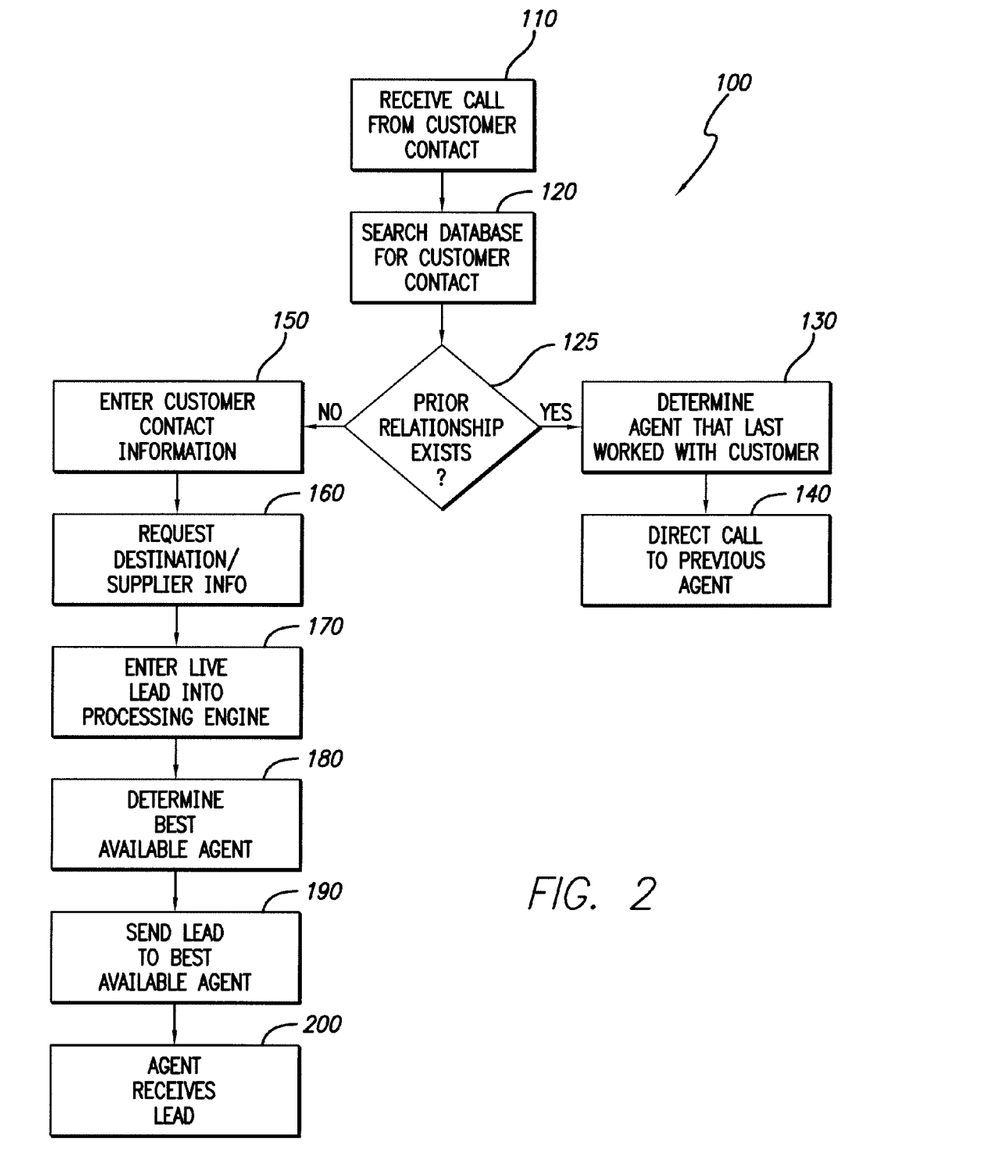
FIG. 2 is a schematic diagram illustrating a preferred method for distributing leads in accordance with the principles of the invention.

FIG. 2 is a schematic diagram illustrating a preferred method 100 for distributing leads in accordance with the principles of the invention. In particular, step 110 involves a call center representative 60 receiving an incoming request from a customer contact 50 and pre-qualifying the customer information. Some embodiments of the invention involve optional steps 120, 130 and 140. Specifically, in step 120, the CCR 60 searches the database of the leads processing engine 20 to determine the existence of a prior relationship with the customer contact 50 in step 125. If the customer contact 50 exists in the database, the method proceeds to step 130, wherein the processing engine 20 determines the agent who last worked with the customer, and in step 140, the processing engine 20 notifies the CCR 60 to direct the call to this agent. If the incoming call is from a new customer contact 50 that does not exist in the database, the method proceeds to step 150, wherein the CCR 60 enters basic information such as customer name, email address and contact number. In step 160, the CCR 60 requests information from the customer contact 50 regarding the destination of choice and/or the customer's preference regarding supplier, as well as the customer's preferred language. This step may further entail entering the customer's preferred location of agent into the leads processing engine because there are countries which require leads to be serviced by an agent within their own country.

In step 170, the lead is entered by the CCR 60 into the leads processing engine 20. This step may involve entering the vendor or a destination, as well as the customer's preferred language, into the leads processing engine 20. In step 180, the leads processing engine 20 determines the best available agent (or tier of agents) from the pool of available agents 40. In step 190, the processing engine 20 sends out the lead to the best available agent (or agents) from the pool of available agents 40. In step 200, the best available agent (or an agent from the top tier of agents) selects or clicks on the lead from their leads processing engine screen. Alternatively, step 200 may involve receiving the lead from the CCR 60 via conventional phone transfer, using VoIP, or by other electronic communication such as via email or instant messaging. The selection of the agent 30 is based upon an algorithm comprising machine readable or interpretable instructions for determining the best available agent 30. In some embodiments of the invention, the leads processing engine 20 finds all available agents having a specialty or relevant experience with respect to the particular type of lead. In this context, the best available agent 30 may be a specialist chosen from a group of specialist agents that specialize and/or have experience closing particular lead types.

Figure 3:
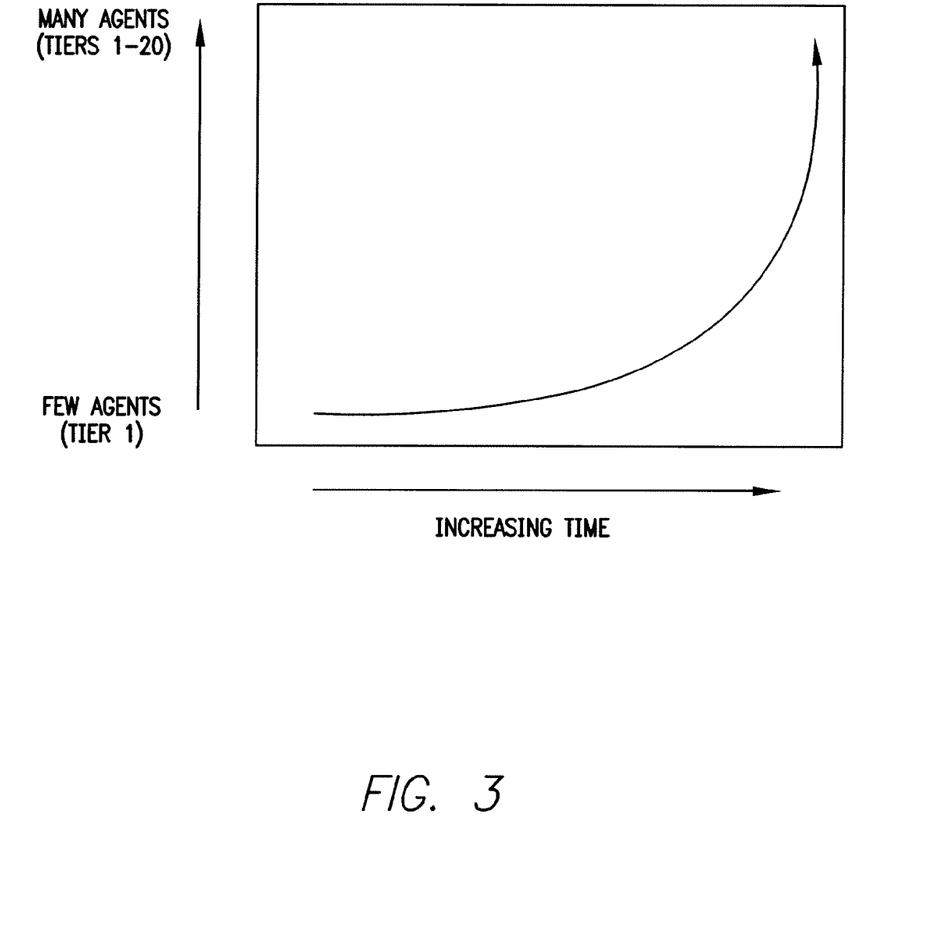
FIG. 3 is a chart plotting number of agents versus time in accordance with an exemplary rollout schedule of the invention.

FIG. 3 is a chart plotting number of agents versus time in accordance with an exemplary rollout schedule of the invention. As time passes, the lead is presented to additional tier levels with increasing frequency. By way of example, the lead is made available exclusively to Tier 1 agents for approximately 60 seconds, and then the lead is made available to Tier 1 and Tier 2 agents exclusively for about 52 seconds. If no available agent has claimed the lead at this point, the leads processing engine 20 continues with the planned rollout with respect to Tiers 3 through 20 until an available agent claims the lead or the rollout is complete.

From this stage forward, (1) Tiers 1-3 are provided with exclusive access to the lead for approximately 48 seconds, (2) Tiers 1-4 are provided with exclusive access to the lead for approximately 45 seconds, (3) Tiers 1-5 are provided with exclusive access to the lead for approximately 41 seconds, (4) Tiers 1-6 are provided with exclusive access to the lead for approximately 38 seconds, (5) Tiers 1-7 are provided with exclusive access to the lead for approximately 35 seconds, (6) Tiers 1-8 are provided with exclusive access to the lead for approximately 32 seconds, (7) Tiers 1-9 are provided with exclusive access to the lead for approximately 29 seconds, (8) Tiers 1-10 are provided with exclusive access to the lead for approximately 26 seconds, (9) Tiers 1-11 are provided with exclusive access to the lead for approximately 24 seconds, (10) Tiers 1-12 are provided with exclusive access to the lead for approximately 22 seconds, (11) Tiers 1-13 are provided with exclusive access to the lead for approximately 20 seconds, (12) Tiers 1-14 are provided with exclusive access to the lead for approximately 18 seconds, (13) Tiers 1-15 are provided with exclusive access to the lead for approximately 16 seconds, (14) Tiers 1-16 are provided with exclusive access to the lead for approximately 14 seconds, (15) Tiers 1-17 are provided with exclusive access to the lead for approximately 13 seconds, (16) Tiers 1-18 are provided with exclusive access to the lead for approximately 12 seconds, (17) Tiers 1-19 are provided with exclusive access to the lead for approximately 11 seconds, and (18) Tiers 1-20 are provided with exclusive access to the lead for approximately 10 seconds. The total elapsed time for the rollout is about 564 seconds, or about 9.5 minutes.

In accordance with a further implementation of the invention, rollout occurs over a reduced overall time period of only 2 minutes. In this example, (1) Tier 1 is provided with exclusive access to the lead for about 10 seconds, (2) Tiers 1 and 2 are provided with exclusive access to the lead for about 9.5 seconds, (3) Tiers 1-3 are provided with exclusive access to the lead for about 9 seconds, (4) Tiers 1-4 are provided with exclusive access to the lead for approximately 8.5 seconds, (5) Tiers 1-5 are provided with exclusive access to the lead for approximately 8 seconds, (6) Tiers 1-6 are provided with exclusive access to the lead for approximately 7.5 seconds, (7) Tiers 1-7 are provided with exclusive access to the lead for approximately 7 seconds, (8) Tiers 1-8 are provided with exclusive access to the lead for approximately 6.5 seconds, (9) Tiers 1-9 are provided with exclusive access to the lead for approximately 6 seconds, (10) Tiers 1-10 are provided with exclusive access to the lead for approximately 5.5 seconds, (11) Tiers 1-11 are provided with exclusive access to the lead for approximately 5 seconds, (12) Tiers 1-12 are provided with exclusive access to the lead for approximately 4.5 seconds, (13) Tiers 1-13 are provided with exclusive access to the lead for approximately 4 seconds, (14) Tiers 1-14 are provided with exclusive access to the lead for approximately 4 seconds, (15) Tiers 1-15 are provided with exclusive access to the lead for approximately 3.5 seconds, (16) Tiers 1-16 are provided with exclusive access to the lead for approximately 3.5 seconds, (17) Tiers 1-17 are provided with exclusive access to the lead for approximately 3 seconds, (18) Tiers 1-18 are provided with exclusive access to the lead for approximately 3 seconds, (19) Tiers 1-19 are provided with exclusive access to the lead for approximately 2.5 seconds, and (20) Tiers 1-20 are provided with exclusive access to the lead for approximately 2 seconds. The total elapsed time for this rollout is about 2 minutes.

Once a lead has rolled out to Tier 20, all agents for the lead from Tier 1 through Tier 20 will have access to the lead and the option to claim it. Based upon the 2 minute rollout, Tier 1-20 will only have exclusive rights to this lead for about 2 seconds after rolling out to Tier 20. After this, the lead is then released to all available agents in the leads processing engine 20, regardless of specialty.

As used herein, the term "network" refers to any configuration of data processing devices and software connected for information interchange. For example, the network may comprise the Internet, an intranet, a corporate network, a local area network (LAN), a wide area network (WAN), a virtual private network (VPN), an internetwork, a personal area network (PAN), a campus area network (CAN), a metropolitan area network (MAN), or any other configuration of data processing devices and software connected for information interchange.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The invention claimed is:

1. A system for the generation and distribution of leads, comprising:
   means for receiving and entering incoming customer requests from customer contacts; and
   a leads processing engine for receiving the customer requests, creating leads based upon the customer requests, determining a best available agent or agents for each lead from a pool of available agents based upon one or more selected results-based performance factors, and offering and/or sending each lead to the best available agent or agents;
   wherein the one or more selected results-based performance factors include a closing ratio based upon a specific vendor for each of the agents from the pool of available agents;
   wherein for each lead, the leads processing engine pools all available agents for a particular specialty based upon the type of lead, and provides a ranking of agents derived from the one or more selected results-based performance factors.

2. The system of claim 1, wherein the selection of the best available agent is based upon an algorithm comprising machine readable or interpretable instructions for determining the particular agent or agents best suited to close the lead.

3. The system of claim 1, wherein upon receiving an incoming customer request, a call center representative searches a database of the leads processing engine to determine whether a prior relationship exists with the customer contact.

4. The system of claim 3, wherein if the customer contact exists in the database, the processing engine determines the agent who last worked with the customer, and may direct the lead to this agent.

5. The system of claim 3, wherein the determination of a prior relationship with the customer contact is based upon the agent who last booked the customer contact and/or the agent who had last contact with the customer contact.

6. The system of claim 1, wherein if the incoming call is from a new customer contact that does not exist in the database, the call center representative enters basic information of the new customer contact including a customer name, an email address and a contact number.

7. The system of claim 1, wherein a call center representative queries the customer contact regarding the customer's destination and/or preferred supplier, as well as the customer's preferred language.

8. The system of claim 7, wherein either the destination or the preferred supplier is a required field for the lead to be entered by the call center representative into the leads processing engine.

9. The system of claim 7, wherein the call center representative enters the customer's destination and/or preferred supplier into leads processing engine, and also enters the customer's preferred language.

10. The system of claim 1, wherein the leads processing engine finds all available agents having a specialty or relevant experience with respect to a particular type of lead.

11. The system of claim 1, wherein an agent must log onto the leads processing engine and provide an indication of availability in order to be offered a lead.

12. The system of claim 1, wherein the best available agent comprises a specialist or specialists chosen from a group of specialist agents that specialize in and/or have experience closing a particular lead type.

13. The system of claim 1, wherein the one or more selected results-based performance factors are further selected from the group consisting of:
- total sales over a selected time frame with respect to a selected vendor,
- total SQi (Service Quality Index),
- recency and/or total time agent has been logged into the leads processing engine over a selected time frame,
- repeat and/or referral customer percentages overall and/or per lead,
- average revenue per sale based on vendor,
- average revenue per lead by vendor, and
- average bookings per lead claimed.

14. The system of claim 1, wherein the best available agent selects or clicks on the lead from a leads processing engine screen to claim the lead.

15. The system of claim 1, wherein the lead is offered and/or sent to the best available agent by conventional phone transfer.

16. The system of claim 1, wherein the lead is offered and/or sent to the best available agent using VoIP to transmit the lead by voice signals over the Internet or other data network.

17. The system of claim 1, wherein the lead is offered and/or sent to the agent using the leads processing engine to electronically transmit the lead over the Internet or other data network in the form of an email or Instant Message.

18. The system of claim 1, wherein the one or more selected factors are selectively weighted such that different factors include different weights in determining the best available agent.

19. A system for distributing leads, comprising:
- means for receiving and entering incoming customer requests from customer contacts; and
- a leads processing engine for receiving the customer requests, creating leads based upon the customer requests, pooling all available agents for a particular specialty based upon the type of lead, and providing a tiering of agents derived from one or more selected results-based performance factors, such that each available agent is slotted within a tier level;
- wherein the one or more selected results-based performance factors include a closing ratio based upon a specific vendor for each of the agents from the pool of available agents;
- wherein for each lead, the leads processing engine pools all available agents for a particular specialty based upon the type of lead, and provides a ranking of agents derived from the one or more selected results-based performance factors.

20. The system of claim 19, wherein the one or more selected results-based performance factors further include closing ratio based upon a specific destination.

21. The system of claim 19, wherein the one or more selected results-based performance factors are further selected from the group consisting of:
- total sales over a selected time frame with respect to a selected vendor,
- total SQi (Service Quality Index),
- recency and/or total time agent has been logged into the leads processing engine over a selected time frame,
- repeat and/or referral customer percentages overall and/or per lead,
- average revenue per sale based on vendor,
- average revenue per lead by vendor, and
- average bookings per lead claimed.

22. The system of claim 19, wherein the one or more selected factors are selectively weighted such that different factors include different weights in determining the tier for each agent.

23. The system of claim 19, wherein each agent is slotted in a tier level that is based on the agent's ranking in comparison to the other agents.

24. The system of claim 19, wherein tier levels are calculated on a daily basis.

25. The system of claim 19, wherein when a new lead is submitted, the leads processing engine accesses agent tier information stored in a database and determines the total available agents based on a vendor or supplier specialty submitted by a customer care representative.

26. The system of claim 19, wherein the leads processing engine sorts the tiers from highest ranking to lowest ranking.

27. The system of claim 19, wherein pooling all available agents for a particular specialty based upon the type of lead is performed in anticipation of a rollout of the leads, wherein the leads are distributed to the tiers of agents over time in accordance with the rankings.

28. The system of claim 27, wherein the rollout is accomplished by releasing the lead over time, first to the highest ranking tier, then to the next highest ranking tier, and continuing until the lead is released to the lowest ranking tier, or until an available agent claims the lead.

29. The system of claim 28, wherein the highest ranking tier is given exclusive rights to claim the lead for a predetermined time period before the next highest ranking tier is also given access to the lead, whereby the rollout is skewed to provide the top tiers with a greater opportunity than the lower tiers to claim the lead.

30. A method for distributing leads, comprising the steps of:
(a) receiving an incoming request from a customer contact and entering the request into a leads processing engine;
(b) requesting information from the customer contact regarding the customer's destination and/or the customer's preference regarding supplier, as well as the customer's preferred language;
(c) entering a lead based on the incoming request into the leads processing engine;
(d) determining a best available agent from a pool of available agents based upon one or more selected results-based performance factors; and
(e) offering and/or sending the lead to the best available agent;
wherein step (d) is performed by the leads processing engine;
wherein the one or more selected results-based performance factors include a closing ratio based upon a specific vendor for each of the agents from the pool of available agents;
wherein for each lead, the leads processing engine pools all available agents for a particular specialty based upon the type of lead, and provides a ranking of agents derived from the one or more selected results-based performance factors.

31. The method of claim 30, wherein steps (a), (b), (c), (d) and (e) are performed automatically by the leads processing engine using VOIP.

32. The method of claim 30, wherein steps (a), (b), (c), (d) and (e) are performed automatically by the leads processing engine using web-based technology.

33. The method of claim 30, wherein step (c) comprises entering the customer's destination and/or the customer's preference regarding supplier, as well as the customer's preferred language, into the leads processing engine.

34. The method of claim 30, wherein step (e) is accomplished via conventional phone transfer.

35. The method of claim 30, wherein step (e) is accomplished using VoIP.

36. The method of claim 30, wherein step (e) is accomplished using email or instant messaging.

37. The method of claim 30, wherein step (a) further comprises searching a database of the leads processing engine to determine whether a prior relationship with the customer contact exists.

38. The method of claim 37, wherein if the customer contact exists in the database, the leads processing engine determines the agent who last worked with the customer, and notifies the customer care representative to direct the call to this agent.

39. A method for distributing leads, comprising the steps of:
   (a) receiving an incoming request from a customer contact and entering the request into a leads processing engine;
   (b) requesting information from the customer contact regarding the customer's destination and/or the customer's preference regarding supplier, as well as the customer's preferred language;
   (c) entering a lead based on the incoming request into the leads processing engine;
   (d) pooling all available agents for a particular specialty based upon a type of lead, and providing a tiering of agents derived from one or more selected results-based performance factors, such that each available agent is slotted within a tier level; and
   (e) rolling out the lead to the agents over time by tier;
   wherein steps (d) and (e) are performed by the leads processing engine;
   wherein the one or more selected results-based performance factors include a closing ratio based upon a specific vendor for each of the agents from the pool of available agents;
   wherein for each lead, the leads processing engine pools all available agents for a particular specialty based upon the type of lead, and provides a ranking of agents derived from the one or more selected results-based performance factors.

40. The method of claim 39, wherein the one or more selected results-based performance factors further include closing ratio based upon a specific destination.

41. The method of claim 39, wherein the one or more selected results-based performance factors are further selected from the group consisting of:
   total sales over a selected time frame with respect to a selected vendor,
   total SQi (Service Quality Index),
   recency and/or total time agent has been logged into the leads processing engine over a selected time frame,
   repeat and/or referral customer percentages overall and/or per lead,
   average revenue per sale based on vendor,
   average revenue per lead by vendor, and
   average bookings per lead claimed.

42. The method of claim 39, wherein the one or more selected results-based performance factors are selectively weighted such that different factors include different weights in determining the tier for each agent.

43. The method of claim 39, wherein each agent is slotted in a tier level that is based on the agent's ranking in comparison to the other agents.

44. The method of claim 39, wherein step (e) is accomplished by releasing the lead over time, first to the highest ranking tier, then to the next highest ranking tier, and continuing until the lead is released to the lowest ranking tier, or until an available agent claims the lead.

45. The method of claim 44, wherein the highest ranking tier is given exclusive rights to claim the lead for a predetermined time period before the next highest ranking tier is given access to the lead, whereby the rollout is skewed to provide the top tiers with a greater opportunity than the lower tiers to claim the lead.

46. The system of claim 1, wherein determining a best available agent or agents for each lead is further based upon one or more factors selected from the group consisting of: (i) maximum amount per lead (% and/or $) agent is willing to pay; (ii) minimum share of commission per lead (% and/or $) agent is willing to accept; and (iii) manual override (x-factor) that may be set by a system administrator to skew the curve if necessary; (iv) average and anticipated "hold" times; and (v) number of leads available.

47. The system of claim 19, wherein determining a best available agent or agents for each lead is further based upon one or more factors selected from the group consisting of: (i) maximum amount per lead (% and/or $) agent is willing to pay; (ii) minimum share of commission per lead (% and/or $) agent is willing to accept; and (iii) manual override (x-factor) that may be set by a system administrator to skew the curve if necessary; (iv) average and anticipated "hold" times; and (v) number of leads available.

48. The system of claim 39, wherein determining a best available agent or agents for each lead is further based upon one or more factors selected from the group consisting of: (i) maximum amount per lead (% and/or $) agent is willing to pay; (ii) minimum share of commission per lead (% and/or $) agent is willing to accept; and (iii) manual override (x-factor) that may be set by a system administrator to skew the curve if necessary; (iv) average and anticipated "hold" times; and (v) number of leads available.

* * * * *